Figure 1:
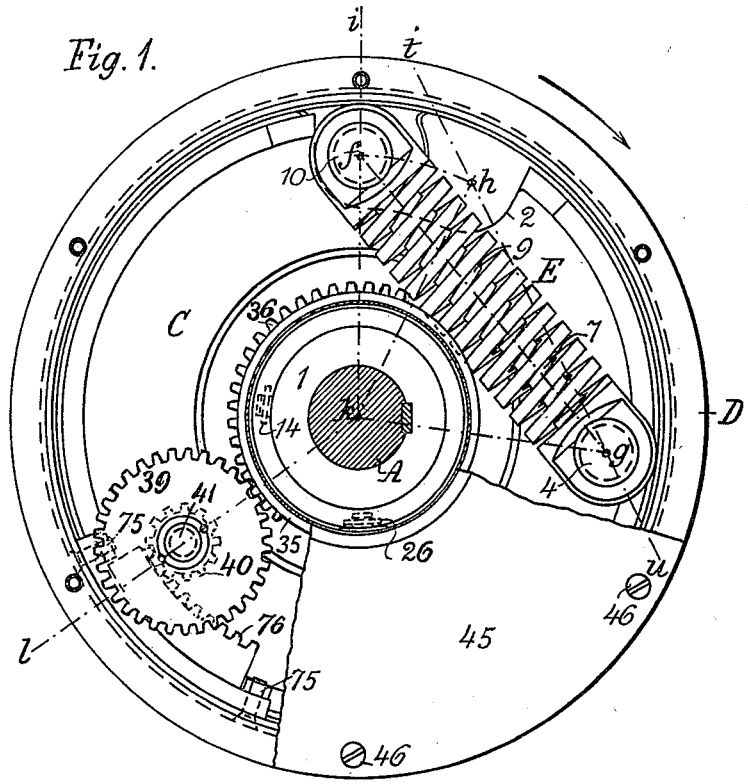

No. 670,324.  
K. LEVERKUS.  
DYNAMOMETER.  
(Application filed Jan. 2, 1901.)  
(No Model.)

Patented Mar. 19, 1901.

3 Sheets—Sheet 1.

Witnesses  
Paul Hunter  
John Lotka

Inventor  
Karl Leverkus  
By Munn  
Attorneys

No. 670,324. Patented Mar. 19, 1901.
K. LEVERKUS.
DYNAMOMETER.
(Application filed Jan. 2, 1901.)
(No Model.) 3 Sheets—Sheet 2.
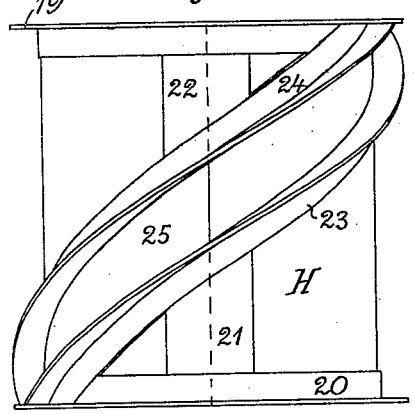
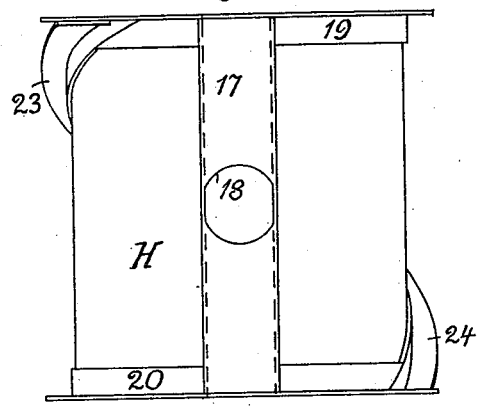
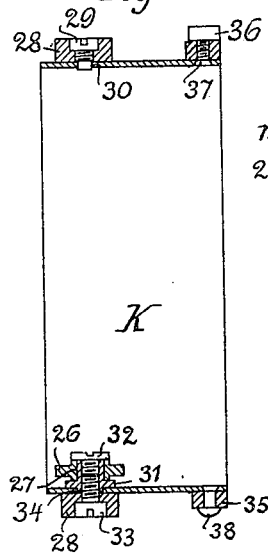
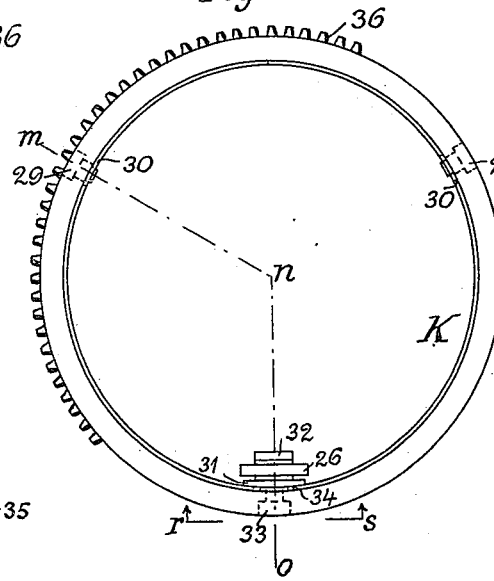
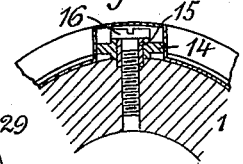
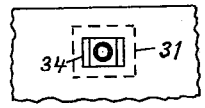
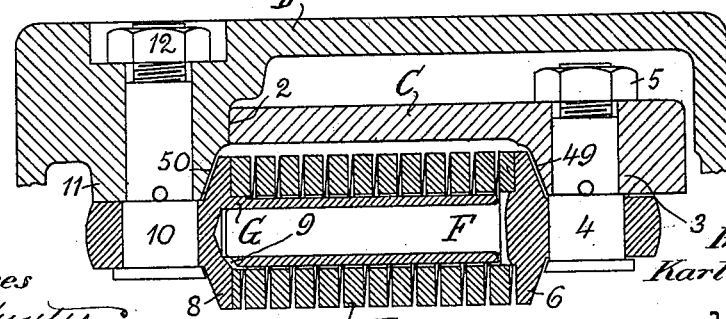
Witnesses
Paul Hunter
John Loeka
Inventor
Karl Leverkus
By Munn
Attorneys
THE NORRIS PETERS CO., PHOTO-LITHO., WASHINGTON, D. C.

No. 670,324. Patented Mar. 19, 1901.
K. LEVERKUS.
DYNAMOMETER.
(Application filed Jan. 2, 1901.)
(No Model.) 3 Sheets—Sheet 3.
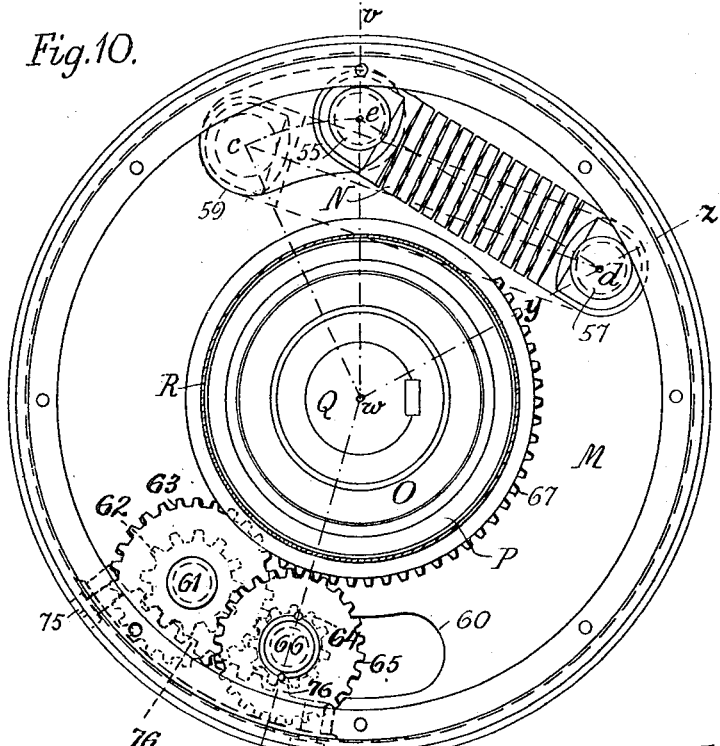
Fig. 10.
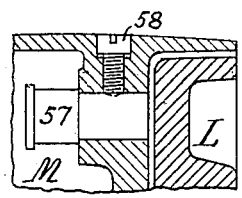
Fig. 12.
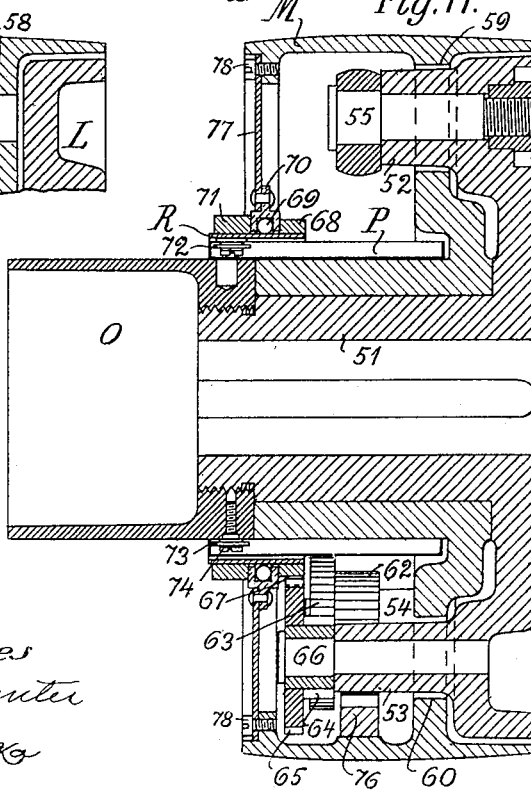
Fig. 11.
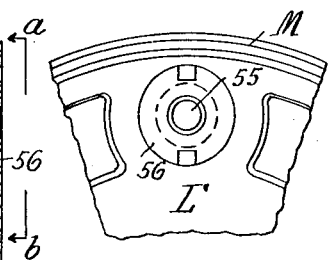
Fig. 13.
Witnesses
Paul Hunter
John Lotka
Inventor
Karl Leverkus
By 
Attorneys
THE NORRIS PETERS CO., PHOTO-LITHO., WASHINGTON, D. C.

UNITED STATES PATENT OFFICE.

KARL LEVERKUS, OF CHARLOTTENBURG, GERMANY.

DYNAMOMETER.

SPECIFICATION forming part of Letters Patent No. 670,324, dated March 19, 1901.

Application filed January 2, 1901. Serial No. 41,347. (No model.)

*To all whom it may concern:*

Be it known that I, KARL LEVERKUS, a subject of the Emperor of Germany, residing at Charlottenburg, in the Empire of Germany, have invented certain new and useful Improvements in Dynamometers, of which the following is a specification.

My invention consists in improvements in certain dynamometers serving for measuring the power transmitted from a shaft to another one or from without to a shaft by any approved means—such as a belt, chain, rope, gear-teeth, and so on—or from a shaft to without by any approved means. The said dynamometers are of that kind in which the members—such as disks, belt-pulleys, chain-wheels, rope-pulleys, gear-wheels, and so on—are connected by one or several springs of any approved description and arranged at a certain distance from the shaft and at right angles thereto for taking up and transmitting the power in such a manner that during the running of the shaft the two members, under the action of the varying power, change their relative positions through a certain angle in proportion to the deflection of the spring or springs bent, compressed, or drawn out, the relative revolution or distortion of the members being changed by means of slanting or spiral faces into the lengthwise motion of a part of the indicating or measuring device. Such dynamometers have the disadvantage that the relative revolution or distortion of the two members is too small for obtaining a sufficiently large motion of the lengthwise-moving part to render the measuring of the power easy and exact. To remedy this defect according to my invention, a tooth-gearing is employed for increasing or enlarging the motion of the lengthwise-movable part. This improvement alone would, however, not suffice, because there would be still the disadvantage that the movable parts of the indicating or measuring device are comparatively heavy and cause a certain amount of friction by their weight, whereby the exactitude of the dynamometer is reduced or rendered illusive. Moreover, it is to be taken into consideration that there are four parts changing their positions in relation to each other—viz., the two members and the two movable parts of the indicating or measuring device, of which latter the one is revoluble and the other is moving lengthwise. Also there would be the disadvantage that the manufacture of the movable parts of the indicating or measuring device from cast metal would be more or less difficult and expensive. To remedy these defects, the movable parts of the indicating or measuring device are, according to my invention, made entirely, or for the most part, of sheet metal and the lengthwise-movable part is provided with longitudinal and spiral grooves, while the movable part and the one member are provided with rollers engaging in said longitudinal and spiral grooves. By these improvements several important advantages are obtained. The faces of the members which are in contact with the movable parts of the indicating or measuring device are simply turned and the one member is provided with rollers on pins easily to be affixed. Thus no threads and no longitudinal grooves need be cut into the members. For this reason alone the manufacture of the dynamometer is simplified and cheapened. The lengthwise-movable part, provided with one or several longitudinal grooves and one or several spiral grooves, can be produced from sheet metal easily and cheaply. The weight of the movable parts is reduced. Hence also the friction is diminished in proportion, and this the more since the motion of the lengthwise-movable part is greatly facilitated by the constant revolution of the dynamometer. By the several improvements named the required exactitude of the dynamometer is guaranteed.

My invention is illustrated by the accompanying drawings, in which—

Figure 2:
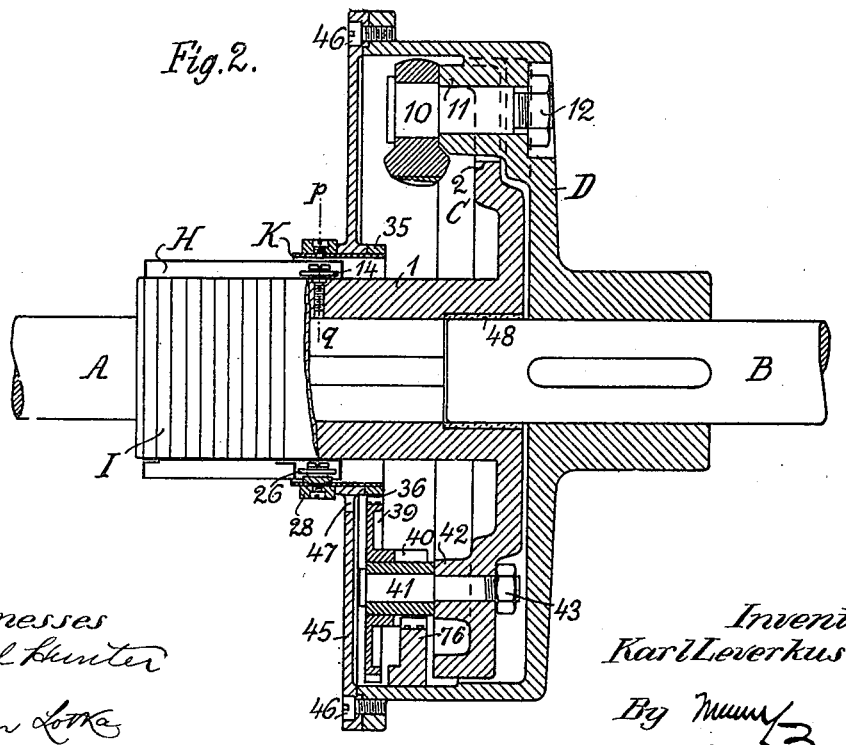

Figure 1 is a front view of a dynamometer for measuring the power transmitted from a shaft to another shaft, the cover being partly broken away and the revoluble part of the indicating or measuring device being partly shown in cross-section. Fig. 2 is a longitudinal section of the same on the broken line *i k l* in Fig. 1, the nave of the left-hand member being partly shown in elevation. Fig. 3 is an elevation of the lengthwise-movable part of the indicating or measuring device on an enlarged scale. Fig. 4 is an elevation of the same from the opposite side. Fig. 5 is a longitudinal section, on an enlarged scale, of the revoluble part of the indicating or measuring device on the broken line *m n o* in Fig. 6. Fig. 6 is the front view of the same. Fig. 7 is a cross-section, on an enlarged scale, through part of the nave of the left-hand member and of the lengthwise-movable part of the indicating or measuring device on the line *p q* in Fig. 2. Fig. 8 represents a detail which will be referred to later on. Fig. 9 is a section, on an enlarged scale, through the compressed power-transmitting spiral spring and the members on the line *t u* in Fig. 1, parts being broken away. Fig. 10 is a front view of a dynamometer for measuring the power transmitted from without by a belt to a shaft or from the shaft by the belt to without, the cover being taken off and the revoluble part of the indicating or measuring device being shown in cross-section. Fig. 11 is a longitudinal section of the same on the broken line *v w x* in Fig. 10. Fig. 12 is a section through part of the two members on the line *y z* in Fig. 10; and Fig. 13 is the view of a part of the dynamometer, taken from the line *a b* in Fig. 11.

Similar reference characters refer to similar parts throughout the several views.

In the dynamometer represented by Figs. 1 to 9, the one member C (a disk) is fastened on the shaft A, and the other member D, also a disk, on the shaft B. Between the two members C and D the compressible spiral spring E is introduced for transmitting and measuring the power. The spiral spring E is arranged to bear against the shoulders 6 and 8 of the heads of the rods F and G, respectively. The one rod G is made hollow to receive the other rod F, engaging and sliding therein. At one end the tubular rod G has a vent 9 to allow air to pass in or out as the rod F slides in the tube G, the tube and rod forming together a dash-pot. The head of the rod F embraces the pin 4, which is embedded in the boss 3 of the one member C and therein secured by the nut 5. In a similar manner the head of the rod G embraces the pin 10, embedded in the boss 11 of the other member D and secured by the nut 12. The member C is cut out at 2 to leave room for the boss 11 of the other member D moving therein freely.

In Fig. 1 the spiral spring E is shown in its natural state while occupying the position *f g*. When, for example, the shaft B, as the driving one, is revolved in the direction of the arrow in Fig. 1, the member D, fastened on it, will by the spiral spring E move the other member C, while the spiral spring E, under the action of the power transmitted, is more or less compressed.

The spiral spring E is represented in Fig. 9 in the state of its greatest compression, which is limited by the cut 2. In this state the spiral spring occupies the position *h g* in Fig. 1. The angle *f k h* will then represent the angle through which the two members C and D may change their relative positions. As will be seen, this angle is comparatively small, which, however, is advantageous for the dynamometer, since the spiral spring E will then not make too strong oscillations during the variations of the power, and hence the disturbances in the motion of the shafting will be less perceivable. In order to obtain, in spite of the smallness of the relative movement of the members C and D, a sufficiently large motion of the lengthwise-movable part H of the indicating or measuring device, the following tooth-gearing is employed: At the inner periphery of the member D the segmental rack 44 is affixed by means of the screws 45 45. In the boss 42 of the other member C the pin 41 is embedded and secured by the nut 43. Around the pin 41 the pinion 40 revolves, which engages the rack 44 and carries on its lengthened nave the gear-wheel 39, with which it is rigidly connected by any suitable means—for example, by two small screws. The gear-wheel 39 engages the teeth 36 at the revoluble part K of the indicating or measuring device. This part K is mounted to revolve in the cover 45, the cover 45 being secured to the member D by the screws 46 46. On the revoluble part K the roller 26 is journaled to engage the spiral groove 25 of the lengthwise-movable part H. The latter is mounted to slide on the long nave 1 of the member C and is prevented from turning by the roller 14, carried by this nave, the roller 14 engaging the longitudinal groove 17 of the part H. At the outer end of the nave 1 the scale I is arranged, which, according to a well-known construction, may consist of a number of parallel lines or narrow furrows turned in the nave and filled up with color. In Fig. 2 these furrows or the like are represented by black lines. To facilitate the reading of the power transmitted—*i. e.*, the counting of the lines or furrows—some of them may be black and some others red or of any color. Owing to the tooth-gearing parts 44, 40, 39, and 36 so large a motion is given to the lengthwise-movable part H that it may be drawn into the dynamometer and completely hidden by the revoluble part K when the spiral spring E is entirely compressed, in which case the whole scale I is fully uncovered.

The lengthwise-movable part H is separately shown in Figs. 3 and 4. It consists of a strip of sheet metal bent at four places to form the longitudinal groove 17 and otherwise bent to a cylinder, the joint being covered by the plates 21 22, the annular angular strips 19 20 for stiffening the edges, and the two spiral angular strips 23 24, forming the spiral groove 25. These plates and strips may be affixed to the cylinder by brazing, riveting, or otherwise. In the wall of the longitudinal groove 17 the aperture 18 is made for introducing the roller 14 and the screw 16, holding same, Fig. 7. The roller 14 is preferably made of hardened steel. To protect the screw 16 against undue wear and tear, also against unintended loosening, a sleeve 15, of hardened steel, is put over it, which engages with a recess in the nave 1 and serves as a bearing for the roller 14.

The revoluble part K is illustrated in Figs. 5 and 6. It consists of a strip of sheet metal bent to a cylinder and held together at the edges by the rings or collars 28 and 35. The collar 35 is provided with the teeth 36 named above and may be connected with the cylinder by rivets 38 and screws 37. The collar 28 carries the roller 26, preferably, by means of the rectangular plate 31, provided with the bearing 27 for the roller. The plate 31, by means of its rectangular projection, engages with the oblong aperture 34 in the cylinder, as is shown in Fig. 8, which is a view of part of the cylinder from the line $r$ $s$ in Fig. 6. The plate 31 is connected with the collar 28 by the screw 33, while the roller 26 is prevented from coming off by the head of the screw 32. The collar 28 is prevented from shifting lengthwise by the plate 31 and the two screws 29. The thinner ends of the latter engage with oblong or oval apertures 30 30 in the cylinder. The apertures 30 30 34 allow of the collar 28 being revolved through a certain angle on the cylinder in order to adjust the lengthwise-movable part H on the scale I by means of the roller 26. To avoid every friction between the two movable parts H and K of the indicating or measuring device, a certain space is preferably left between them, as is shown in Figs. 1 and 2.

As will be seen from Fig. 1, the lever-arm or the distance of the power transmitted and acting in the axis of the spring E from the center of the shaft will be the larger the more the power increases. Therefore it is peferable to give the spiral groove 25 a varying inclination or pitch, as is shown in Fig. 3, in order to obtain a uniform division of the scale I. The spiral spring E could of course be arranged for being drawn out by the force transmitted; but it is preferable to arrange it for compression, as illustrated, so as to keep the lever-arm of the power transmitted as large as possible for the given size of the dynamometer. For the same reason the heads of the rods F and G are made as short as possible, so as to render the spiral spring E as long as possible. The bosses 3 and 11, Fig. 9, of the members C and D are cut off at 49 and 50, respectively, to get sufficient space for the heads 6 and 8 of the rods.

The cover 45 may be provided with an aperture 47 for inspecting the teeth 36 and those of the gear-wheel 39. Thereby the putting together of the parts of the dynamometer will be facilitated.

The member C may receive a bush 48 to protect the shaft B against corrosion.

In another mode of execution of the dynamometer (represented in Figs. 10 to 13) the one member L, fastened on the shaft Q, is a disk. On its nave 51 the other member M—a belt-pulley—is mounted to revolve and secured against lengthwise motion by the cylinder O, which is screwed on the nave 51 and is provided with the scale. The compressible spiral spring N is in a similar manner, as before, arranged to bear against the heads of two rods sliding in each other. In the boss 52 of the member L, projecting through the aperture 59 of the other member M, the pin 55 for the spiral spring N is embedded and secured by the nut 56, as is also shown in Fig. 13. The other pin 57 of the spiral spring N is embedded in a boss of the member M and secured by the screw 58, Fig. 12. By the aperture 59 the compression of the spiral spring N is again limited. In Fig. 10 the spiral spring N is shown in the state of its greatest compression while occupying the position $e\, d$. In its natural state, on the contrary, it is indicated by the dotted lines and will occupy the position $c\, d$. The space inside the dynamometer being too limited for a single purchase of the tooth-gearing, as before, a double purchase is employed for multiplying the angular movement of the revoluble part R of the indicating or measuring device relatively to the angular movement $c\, w\, e$ of the member L. The member L is provided with two bosses 53 and 54, which project through the aperture 60 of the member M and carry the pins 61 and 66. The latter may be secured by screws similar to 58 in Fig. 12 or otherwise. Around the pin 61 revolve together the pinion 62 and the gear-wheel 63, of which the former engages the rack 76, affixed to the member M by the screws 75 75. Around the second pin 66 revolve together the pinion 64 and the gear-wheel 65, of which the former engages the gear-wheel 63 and the latter the segmental rack 67. The revoluble part R again moves the lengthwise-movable part P by the roller 72. The roller 73, engaging the longitudinal groove of the part P, revolves around the screw 74, which is secured to the cylinder O. The construction of the part P is substantially the same as that of the part H in Figs. 3 and 4. Between the two parts R and P of the indicating or measuring device again a certain space is left to avoid every friction between them. In order to reduce the friction between the revoluble part R and the cover 77, affixed to the member M by the screws 78, the part R runs on a series of balls 69 in the annular casing 70. The collars 68 and 71 for securing the part R are similar to those 35 and 28 in Figs. 5 and 6.

The dynamometer may be constructed in various manners without deviating from the spirit of my invention. As already indicated, the two members of the dynamometer may be of every description. They may be disks, belt-pulleys, chain-wheels, rope-pulleys, gear-wheels, and so on. The construction of the two movable parts of the indicating or measuring device made of sheet metal may be varied. The lengthwise-moving part may be made in two halves, of which the one receives the longitudinal groove and the other the spiral groove. The lengthwise-movable part is illustrated in the drawings as being made of sheet metal by bending and brazing, riveting, or otherwise. It may, however, be made of sheet metal by stamping, spinning in the lathe, or otherwise. In a similar manner the revoluble part of the indicating or measuring device may be constructed otherwise than represented. The tooth-gearing for enlarging the motion of the lengthwise-moving part will have to be arranged according to the circumstances. The ball-bearing for carrying the revoluble part may be employed or omitted.

What I claim as my invention, and desire to secure by Letters Patent, is—

1. In a rotary dynamometer, the combination with a first member, of a second member, both members being arranged on the same center line, a spring connecting said two members and arranged for transmitting the power from the one member to the other member, a scale arranged on one of said members, a surrounding part movable longitudinally on said scale and provided with a longitudinal groove and a spiral groove, a roller pivoted on one of said members for engaging the one of said grooves, a revoluble part mounted concentrically in one of said members, a roller pivoted on said revoluble part for engaging the other of said grooves, and a tooth-gearing for transmitting the displacement of said members due to the deflection of said spring multiplied to said revoluble part, whereby said longitudinally-movable part is caused to move in proportion to the power transmitted, substantially as set forth.

2. In a rotary dynamometer, the combination with a first member fastened on a shaft, of a second member concentrical with said shaft, a spiral spring connecting said two members and arranged for transmitting the power from the one member to the other member, a cylindrical scale arranged concentrically on one of said members, a surrounding part movable longitudinally on said cylindrical scale and provided with a longitudinal groove and a spiral groove, a roller pivoted on one of said members for engaging the one of said grooves, a revoluble part mounted concentrically in one of said members, a roller pivoted on said revoluble part for engaging the other of said grooves, and a tooth-gearing for transmitting the displacement of said members due to the deflection of said spiral spring multiplied to said revoluble part, whereby said longitudinally-movable part is caused to move in proportion to the power transmitted, substantially as set forth.

3. In a rotary dynamometer, the combination with a first member fastened on a shaft, of a second member concentrical with said shaft, the two members being each provided with a pin at a certain distance from and parallel to said shaft, a spiral spring connected at the ends with the pins of said members and arranged for transmitting the varying power from the one member to the other member, a cylindrical scale arranged concentrically on one of said members, a surrounding part movable longitudinally on said cylindrical scale and provided with a longitudinal groove and a spiral groove, a roller pivoted on one of said members for engaging the one of said grooves, a revoluble part mounted concentrically in one of said members, a roller pivoted on said revoluble part for engaging the other of said grooves, and a tooth-gearing for transmitting the displacement of said members due to the deflection of said spring multiplied to said revoluble part, whereby said longitudinally-movable part is caused to move in proportion to the power transmitted, substantially as set forth.

4. In a rotary dynamometer, the combination with a first member fastened on a shaft, of a second member concentrical with said shaft, the two members being each provided with a pin at a certain distance from and parallel to said shaft, a hollow rod with a head mounted on one of said pins to revolve, a rod arranged to slide in said hollow rod and provided with a head mounted on the other of said pins to revolve, a compressible spiral spring surrounding said two rods and bearing against the heads of same for transmitting the varying power from the one member to the other member, a cylindrical scale arranged concentrically on one of said members, a surrounding part movable longitudinally on said cylindrical scale and provided with a longitudinal groove and a spiral groove, a roller pivoted on said cylindrical scale for engaging the one of said grooves, a revoluble part mounted concentrically in one of said members, a roller pivoted on said revoluble part for engaging the other of said grooves, and a tooth-gearing for transmitting the displacement of said members due to the deflection of said spiral spring multiplied to said revoluble part, whereby said longitudinally-movable part is caused to move in proportion to the power transmitted, substantially as set forth.

5. In a rotary dynamometer, the combination with a first member fastened on a shaft, of a second member concentrical with said shaft, the one of said members being provided at a certain distance from said shaft with a boss and the other member with an aperture for said boss, whereby the displacement of the two members is limited to a certain angle, a pin fastened in said boss parallel to said shaft, another pin fastened in the other member at a certain distance from said shaft and parallel to said pin in the same plane at right angles to said shaft, a hollow rod with a head mounted on one of said pins to revolve, a rod arranged to slide in said hollow rod and provided with a head mounted on the other of said pins to revolve, a compressible spiral spring surrounding said two rods and bearing against the heads of same for transmitting the varying power from the one member to the other member, a cylindrical scale arranged concentrically on one of said members, a surrounding part movable longitudinally on said cylindrical scale and provided with a longitudinal groove and a spiral groove, a roller pivoted on said cylindrical scale for engaging the one of said grooves, a revoluble part mounted concentrically in one of said members, a roller pivoted on said revoluble part for engaging the other of said grooves, and a tooth-gearing for transmitting the displacement of said members due to the deflection of said spiral spring multiplied to said revoluble part, whereby said longitudinally-movable part is caused to move in proportion to the power transmitted, substantially as set forth.

6. In a rotary dynamometer, the combination with a first member fastened on a shaft, of a second member concentrical with said shaft, the two members being provided each with a pin at a certain distance from and parallel to said shaft, a spiral spring connected at the ends with said pins and arranged for transmitting the varying power from the one member to the other member, a cylindrical scale arranged concentrically on one of said members, a surrounding part movable longitudinally on said cylindrical scale and provided with a longitudinal groove and a spiral groove, a roller pivoted on one of said members for engaging the one of said grooves, a revoluble part mounted concentrically in one of said members and provided with gear-teeth, a roller pivoted on said revoluble part for engaging the other of said grooves, a segmental rack arranged concentrically in one of said members, a tap secured to the other of said members, a pinion mounted on said tap to revolve and engaging said segmental rack, and a gear-wheel connected rigidly to said pinion and engaging said gear-teeth of said revoluble part, so that the displacement of said members due to the deflection of said spiral spring is transmitted in a multiplied degree to said revoluble part, whereby said longitudinally-movable part is caused to move in proportion to the power transmitted, substantially as set forth.

7. In a rotary dynamometer, the combination with a first member, of a second member, both members being arranged on the same center line, a spring connecting said two members and arranged for transmitting the power from the one member to the other member, a cylindrical scale arranged concentrically on one of said members, a surrounding part movable longitudinally on said cylindrical scale and provided with a longitudinal groove and a spiral groove, said longitudinally-movable part being made of sheet metal to reduce its weight and the friction thereby caused, a roller pivoted on said cylindrical scale for engaging the one of said grooves, a revoluble part mounted concentrically in one of said members and made mostly of sheet metal to reduce its weight and the friction thereby caused, a roller pivoted on said revoluble part for engaging the other of said grooves, and means for transmitting the displacement of said members due to the deflection of said spring multiplied to said revoluble part, whereby said longitudinally-movable part is caused to move in proportion to the power transmitted, substantially as set forth.

8. In a rotary dynamometer, the combination of two rotary members the axes of rotation of which coincide, one member being capable of an angular or torsional movement relatively to the other, a yielding connection between said members opposing such torsional movement and tending to bring them back to a normal position, an indicating device comprising a part mounted to move lengthwise of the axis of rotation of said members, a part mounted to turn about said axis and relatively to the indicator, an operative connection for causing a longitudinal movement of one part by the rotation of the other, and an operative connection from one of said members to the rotary part of the indicating device.

9. In a rotary dynamometer, the combination of two rotary members the axes of rotation of which coincide, one member being capable of an angular or torsional movement relatively to the other, a yielding connection between said members opposing such torsional movement and tending to bring them back to a normal position, an indicating device comprising a part mounted to move lengthwise of the axis of rotation of said members, a part mounted to turn about said axis and relatively to the indicator, an operative connection for causing a longitudinal movement of one part by the rotation of the other, and a multiplying-gear between one of said members and the rotary part of the indicating device.

10. In a rotary dynamometer, the combination of two rotary members the axes of rotation of which coincide, one member being capable of an angular or torsional movement relatively to the other, a yielding connection between said members opposing such torsional movement and tending to bring them back to a normal position, a scale arranged to move with one of said members, an indicating device comprising a part mounted to move lengthwise of said scale, a part mounted to turn about the axis of rotation of said members and relatively to the indicator, an operative connection for causing a longitudinal movement of one part by the rotation of the other, and an operative connection from one of said members to the rotary part of the indicating device.

KARL LEVERKUS.

Witnesses:
WOLDEMAR HAUPT,
HENRY HASPER.